United States Patent

Haines

[15] 3,647,540

[45] Mar. 7, 1972

[54] MAGNETIC COMPOSITIONS OF PRASEODYMIUM MODIFIED CHROMIUM OXIDE, METHODS OF MANUFACTURE, AND MAGNETIC RECORDING MEDIA CONTAINING SAME

[72] Inventor: Robert Samuel Haines, Boulder, Colo.

[73] Assignee: International Business Machines Corporation, Armonk, N.Y.

[22] Filed: May 25, 1970

[21] Appl. No.: 40,378

[52] U.S. Cl. ..............................117/235, 252/62.51, 23/145

[51] Int. Cl. ......................................G11b 5/70, C04b 35/00

[58] Field of Search ..................252/62.51; 23/145; 117/235

[56] References Cited

UNITED STATES PATENTS 3,371,043 2/1968 Hund et al. .........................252/62.51

2,923,683 2/1960 Ingraham et al. ...................252/62.51

*Primary Examiner*—James E. Poer

*Assistant Examiner*—J. Cooper

*Attorney*—Hanifin and Jancin and Donald W. Margolis

[57] ABSTRACT

This invention relates to the formation of praseodymium modified ferromagnetic chromium oxide compositions containing 56 to 61 percent chromium combined with oxygen and 1 to 6 percent praseodymium, in the form of uniform finely divided particles. These particles are of tetragonal crystalline structure and have a length-to-width ratio of as much as 20 to 1 and an actual length in the range of about 1 to 7 microns and are utilized in the preparation of magnetic recording media. The process of forming praseodymium modified chromium oxide ferromagnetic compositions consists of mixing a chromium compound with a source of praseodymium, and then subjecting the mixture to heat and pressure.

7 Claims, No Drawings

MAGNETIC COMPOSITIONS OF PRASEODYMIUM MODIFIED CHROMIUM OXIDE, METHODS OF MANUFACTURE, AND MAGNETIC RECORDING MEDIA CONTAINING SAME

BACKGROUND OF THE INVENTION

1. Field of the Invention

This invention relates to magnetic compositions and to novel methods for preparing them. More particularly, it relates to ferromagnetic compositions of praseodymium modified chromium oxide having tetragonal crystal structure, and to methods for their preparation in uniform finely divided particle form. Such particles are suitable for use, for example, in magnetic recording media, magnetic cores, and the like.

2. Description of the Prior Art

In the prior art, various types of magnetic compositions have been prepared in numerous ways. Included in the prior art magnetic compositions are chromium oxides having ferromagnetic properties. These magnetic chromium oxides have been nominally designed as chromium dioxide and have long been reported in the chemical literature. Early methods of preparation of ferromagnetic chromium oxide have been by heating chromium trioxide in oxygen and by pyrolysis of gaseous chromyl chloride. More recently, methods of producing ferromagnetic chromium oxide, primarily from chromium trioxide under conditions of both heat and pressure and in the presence of water, have been reported. Within the last two decades, heightened interest and activity in the preparation of ferromagnetic chromium oxide has resulted in a substantial number of publications being made and patents being issued in this technology. In some instances, the utilization of preferential substances during the formation of chromium dioxide by gas pyrolysis has been reported. In other instances, one or more specific modifying ingredients or oxidizing agents have been included in reaction mixtures of chromium compounds during heat and pressure treatment to yield a ferromagnetic chromium oxide which may or may not be modified with an additive ingredient. In yet another form of activity, multistep processes of treating various chromium compounds with or without modifying ingredients or oxidizing agents, have been utilized to produce forms of ferromagnetic chromium oxide.

It is both useful and desirable to provide alternative methods of preparing magnetic chromium oxides and new magnetic chromium oxide compositions, for use, for example, in the manufacture of magnetic recording media.

SUMMARY OF THE INVENTION

It is an object of the present invention to provide praseodymium modified ferromagnetic chromium oxide compositions and new and improved processes for their preparation.

A further object is to provide novel ferromagnetic chromium oxide materials, including praseodymium as a component.

It is another object of the present invention to provide ferromagnetic praseodymium modified chromium oxide compositions which are useful in the manufacture of magnetic recording media.

Other objects will appear hereinafter.

The present invention provides new types of praseodymium modified chromium oxide compositions by intimately mixing a source of praseodymium with a chromium compound, such as chromium trioxide, and then heating the mixture at a temperature between about 250° and 500° C. while subjecting the reaction mixture to superatmospheric pressure. The praseodymium source may be equivalent to about 1 percent to about 40 percent by weight, of the chromium compound. Pressures ranging from about 50 to 3,000 atmospheres are operable to form ferromagnetic praseodymium modified chromium oxide. Pressures of about 60 to 500 atmospheres are preferred.

The source of praseodymium may be the free metal or any compound containing praseodymium, although due to its easy availability, simple praseodymium salts and oxides are preferred. Intimate mixing of the chromium compound and the praseodymium compound may be obtained, if desired, prior to processing in any suitable manner, such as by grinding the constituent ingredients together, or by dissolving them in a suitable solvent, such as water. After mixing is completed, the combined reaction mixture of praseodymium and chromium, with or without water, is placed in a vessel in which it is both heated and subjected to superatmospheric pressure.

Praseodymium modified magnetic chromium oxide produced by the process of this invention, contains about 56 percent to 61 percent chromium combined with oxygen and about 1 to 6 percent praseodymium and in the form of finely divided particles having an intrinsic coercivity within the range of about 100 to 250 oersteds and a sigma value within the range of about 70 to 100 emu/g. The particles display a rutile (tetragonal) crystalline structure, and are acicular, having a length-to-width ratio of as much as 20 to 1 and an actual length in the range of about 1 to 7 microns.

The foregoing and other objects, features, and advantages of the invention will be apparent from the following more particular description of the preferred embodiments of the invention.

DESCRIPTION OF THE PREFERRED EMBODIMENTS

In the following examples, the reactants were reagent grade chemicals; however, use of commercial grade chemicals is within the scope of this invention. Ferromagnetic particles produced by the method of the present invention were normally separated from the small amounts of unreacted nonmagnetic constituents by washing, and then dried. Reaction efficiency was generally in the range of at least 90 percent. Powder samples of the magnetic compositions produced by the present invention were measured with a vibrating sample magnetometer, VSM, at 4,000 oersteds to determine their magnetic properties. Determination of the chemical content of the magnetic particles were obtained by both X-ray fluorescense spectroscopy and neutron activation. Crystal structure was determined by examination of X-ray diffraction patterns. Particle shape, size, and length-to-width ratios were determined from electron micrographs of the particles. All composition percentages given in the examples are in weight percent.

EXAMPLE I

A rutile praseodymium modified chromium oxide was prepared by placing 1 g. of praseodymium chloride hexahydrate, $PrCl_3 \cdot 6H_2O$, and 6 g. of chromium trioxide, $CrO_3$, in a beaker containing 200 ml. of water. This mixture was gently heated with stirring, allowing the water to evaporate so that a nonmagnetic viscous paste was formed in the bottom of the beaker. This paste was then placed in a Pyrex glass tube having a ground glass joint at its open end, and the tube loosely closed with a ground glass stopper. The tube was then placed in a pressure vessel, and the vessel pressurized at ambient temperature to 1,100 pounds per square inch (75 atmospheres) with air. This pressurized vessel containing the $PrCl_3 \cdot 6H_2O$-$CrO_3$ mixture in a tube was then heated to 250° C. for 1 hour, after which the temperature was raised to 410° C. for an additional hour. The final pressure attained in the vessel, at 410° C. was 3,500 p.s.i. (238 atm.), which pressure was, of course, equal to the pressure within the Pyrex tube due to equilibrium conditions.

After heating was completed, the vessel was cooled to room temperature with water, the pressure released, the vessel opened, and the finely divided black powder formed within the tube removed and washed with water, followed by a final washing with methyl alcohol. The clean powder was then dried at 40° C. and tested for magnetic properties. It was determined on the VSM that the particles were ferromagnetic and had an intrinsic coercivity of 130 oersteds, and a sigma value of 90 emu/g. Analysis of the ferromagnetic material by X-ray fluorescense spectroscopy showed that it contained about 3 percent praseodymium and about 59 percent chromium. An X-ray diffraction analysis made of this material indicated that it contained tetragonal chromium-dioxide-type crystals modified with praseodymium. It was determined by electron micrograph that the particles were uniformly acicular, having lengths of from 1.5 to 7 microns, and a length-to-width ratio of from about 3 to 1 to about 18 to 1. Analysis indicated the reaction was about 90 percent efficient.

EXAMPLE II

One gram of praseodymium nitrate pentahydrate, $Pr(NO_3)_3 \cdot 5H_2O$, and 6 g. of $CrO_3$ were placed in a beaker containing 200 ml. of water and heated with stirring until a nonmagnetic paste was formed in the bottom of the beaker. This paste was then placed in a Pyrex tube with a ground glass joint, as in Example I, the tube loosely closed with a ground glass stopper and placed in a pressure vessel. The vessel was then pressurized with air to 1,000 p.s.i. (68 atm.), heated to 250° C. for 1 hour and then heated for an additional hour at 405° C. The pressure in the vessel at 405° C. was 3700 p.s.i. (252 atm.).

After heating was completed, the vessel was cooled to room temperature with water, the pressure released, the vessel opened, and the finely divided black powder formed within the tube removed and washed with water followed by a methyl alcohol rinse. The powder was dried at 40° C. and then measured for magnetic properties. Intrinsic coercivity of the ferromagnetic powder, as indicated by the VSM was 160 oersteds, while the sigma value was determined to be 87 emu/g. Analysis of the ferromagnetic material by X-ray fluorescense spectroscopy indicated that it contained about 1.5 percent praseodymium, by weight, and about 60.5 percent chromium, by weight. An X-ray diffraction analysis of the powder indicated that it consisted of tetragonal crystals of chromium dioxide modified with a small amount of praseodymium. Electron micrographs of these particles showed them to be uniformly acicular, having a length-to-width ratio on the order of 4 to 1 to about 20 to 1, the particle lengths varying from about 1 to 4 microns.

A second preparation of ferromagnetic praseodymium modified chromium oxide was carried out using I g. $Pr(NO_3)_3 \cdot 5H_2O$ 0.1 g. $K_2CrO_3$ in precisely the same manner as above. In the preparation of the magnetic particles, the temperature was raised to a final temperature of 410° C. at which time the pressure within the container reached 3,850 p.s.i. (262 atm.). The resulting praseodymium modified chromium oxide particles exhibited a sigma value of 72 emu/g. and a coercivity of 240 oersteds. Analysis showed the particles to contain 2.9 percent praseodymium and 59 percent chromium, by weight. The particles had a length-to-width ratio of from about 7 to 1 to about 18 to 1, the particle lengths varying from about 1 to 4 microns.

EXAMPLE III 0.5 g. of praseodymium oxide, $Pr_6O_{11}$, and 6 g. of $CrO_3$ were mixed with 200 ml. of hot water in a beaker, and heated, with stirring, until a viscous nonmagnetic paste was formed in the bottom of the beaker. This paste was then placed in a Pyrex tube with a ground glass joint, the tube loosely closed and placed in a pressure vessel. The vessel was pressurized with air to 1100 p.s.i. (75 atm.), and then heated for 1 hour at 250° C. and for a second hour at 410° C. The final pressure exhibited within the vessel was 3900 p.s.i. (265 atm.). After heating was completed, the vessel was cooled to room temperature with water, the pressure released, the vessel opened, and the Pyrex tube containing a black powder removed therefrom. The powder was removed from the tube, washed with water and with methyl alcohol, and then dried at 40° C.

The dried powder exhibited an intrinsic coercivity of 151 oersteds and a sigma value of 75 emu/g., as measured on the VSM. Analysis of the powder by X-ray fluorescense spectroscopy indicated that it contained approximately 5.1 percent praseodymium and about 56.8 percent chromium. An X-ray diffraction analysis of the ferromagnetic powder showed it to consist of tetragonal chromium dioxide with a small amount of modifying praseodymium as an integral part thereof. Electron micrographs of the powder showed it to be uniformly acicular, about 1 to 4 microns in length with a length-to-width ratio of from 3 to 1 to 18 to 1.

Any chromium compound may be used in the process of the present invention, and the hexavalent compounds, including the trioxide and the oxyhalides are representative examples of compounds which are readily available, fully equivalent, and which are capable of use with good results.

For reasons of economy and availability, praseodymium oxide, or the nitrate or chloride salts, are preferred sources of praseodymium. However, other salts, oxides, or praseodymium, in the elemental form, are fully equivalent and may be used within the scope of the present invention.

While water and the mineral acids are convenient solvents for the initial step of mixing the chromium and praseodymium components of this process, other solvents can be used for the same purpose. Similarly, dry grinding by simple mortar and pestle, or by ball milling may be resorted to in order to obtain the desired combination of reactants. The thermal pressure reaction process may be carried out using either completely dry ingredients or in the presence of a reaction medium, such as water. Additionally, the use of other modifying or oxidizing ingredients, in addition to praseodymium, are within the scope of this invention.

Uses for the materials produced in the foregoing examples are well known. For example, the ferromagnetic compositions produced by the examples may be mixed with nonmagnetic, organic, film-forming finders and utilized to prepare magnetic recording media.

Typical, but not limiting, binders for use singularly, or in combination for preparing various recording media including ferromagnetic particles produced in accordance with this invention are polyesters, cellulose esters and ethers, epoxies, vinyl chloride, vinyl acetate, acrylate and styrene polymers and copolymers, polyurethanes, polyamides, aromatic polycarbonates, and polyphenyl ethers.

A wide variety of solvents may be used for forming a dispersion of the fine ferromagnetic particles produced in the foregoing examples and various binders. Organic solvents, such as ethyl, butyl, and amyl acetate, isopropyl alcohol, dioxane, acetone, methylisobutyl ketone, cyclohexanone, and toluene are useful for this purpose. The particle-binder dispersion may be applied to a suitable substrate by roller coating, gravure coating, knife coating, extrusion, or spraying of the mixture onto the backing, or by other known methods.

In preparing recording media, the magnetic particles usually comprise about 40 to 90 percent, by weight, of the solids in the film layer applied to the substrate. The substrate is usually a flexible resin, such as polyester or cellulose acetate material, although other flexible materials as well as rigid base materials are more suitable for some uses. The specific choice of nonmagnetic substrate binder, solvent, or method of application of the magnetic composition to the support will vary with the properties desired and the specific form of magnetic recording media being produced.

In preparing magnetic cores and permanent magnets, the products of the examples are mixed with nonmagnetic plastic or filler in an amount of about 33 to 50 percent, by volume, of the magnetic material; the particles aligned in a magnetic field; and the mixture pressed into a firm magnet structure. Alignment of the particles may be accomplished in an externally applied DC magnetic field of about 4,000 gauss, or more. Pressures may vary widely in forming the magnet. Pressures up to 100,000 p.s.i. and fields of 28,000 gauss have been used commercially.

While the invention has been particularly shown and described with reference to preferred embodiments thereof, it will be understood by those skilled in the art that various changes in form and details may be made therein without departing from the spirit and scope of the invention.

What is claimed is:

1. A process for producing a ferromagnetic praseodymium modified chromium oxide composition of tetragonal crystal structure consisting essentially of about 56 to 61 percent, by weight, of chromium and about 1 to 6 percent, by weight, of praseodymium, each combined with oxygen, as an integral part of the crystal structure, said ferromagnetic composition having an intrinsic coercivity within the range of about 100 to 250 oersteds and a sigma value within the range of about 70 to 100 emu/g., which comprises:

heating a mixture of chromium trioxide and a praseodymium source at a temperature within the range of about 250° to 500° C. and under a pressure of about 50 atmospheres or greater.

2. The process of claim 1 in which the praseodymium source in said reaction mixture is from about 1 percent to about 40 percent on the weight of chromium trioxide.

3. The process of claim 2 in which the praseodymium source is selected from the group consisting of a praseodymium (III) salt and praseodymium oxide.

4. The process of claim 2 in which the mixture is under a pressure within the range of about 50 to 3,000 atmospheres.

5. The process of claim 4 in which the mixture is under a pressure within the range of about 60 to 500 atmospheres.

6. A praseodymium modified chromium oxide ferromagnetic composition consisting essentially of 56 to 61 percent, by weight, of chromium combined with oxygen and 1 to 6 percent, by weight, of praseodymium combined with oxygen and consisting essentially of acicular particles of tetragonal crystal structure, said ferromagnetic composition having an intrinsic coercivity within the range of about 100 to 250 oersteds and a sigma value within the range of about 70 to 100 emu/g.

7. A magnetic recording medium which comprises a substrate of nonmagnetic material having bonded thereto a magnetic coating of praseodymium modified chromium oxide ferromagnetic composition as set forth in claim 6.

* * * * *

930-4008-00D
PO-1050
(5/69)

UNITED STATES PATENT OFFICE
CERTIFICATE OF CORRECTION

Patent No. 3,647,540 Dated March 7, 1972

Inventor(s) Robert Samuel Haines

It is certified that error appears in the above-identified patent and that said Letters Patent are hereby corrected as shown below:

Column 5, line 16, after "percent" insert --based--.

Signed and sealed this 11th day of July 1972.

(SEAL)
Attest:

EDWARD M.FLETCHER,JR.
Attesting Officer

ROBERT GOTTSCHALK
Commissioner of Patents